United States Patent [19]
Mishina et al.

[11] Patent Number: 5,163,599
[45] Date of Patent: Nov. 17, 1992

[54] REFLOW SOLDERING APPARATUS

[75] Inventors: Haruo Mishina, Ushiku; Masato Itagaki, Kashiwa; Masahumi Wada, Nagareyama, all of Japan

[73] Assignee: Hitachi Techno Engineering Co., Ltd., Tokyo, Japan

[21] Appl. No.: 592,058

[22] Filed: Oct. 2, 1990

[30] Foreign Application Priority Data

Oct. 6, 1989 [JP] Japan .................. 1-260049

[51] Int. Cl.⁵ .................. B23K 1/00; F27B 9/06
[52] U.S. Cl. .................. 228/42; 228/232; 228/180.1; 219/388
[58] Field of Search .................. 219/85.1, 85.17, 85.13, 219/388, 400; 228/42, 232, 230, 240, 180.1

[56] References Cited

U.S. PATENT DOCUMENTS

| | | | |
|---|---|---|---|
| 3,882,596 | 5/1975 | Kendziora et al. | 228/232 |
| 4,664,308 | 5/1987 | Boynton | 228/180.1 |
| 4,771,929 | 9/1988 | Bahr et al. | 228/232 |
| 4,876,437 | 10/1989 | Kondo | 228/20 |
| 4,938,410 | 7/1990 | Kondo | 228/180.1 |

Primary Examiner—Richard K. Seidel
Assistant Examiner—Chuck Y. Mah
Attorney, Agent, or Firm—Antonelli, Terry, Stout & Kraus

[57] ABSTRACT

A reflow soldering apparatus having a pre-heating chamber and a reflow chamber, wherein a hot gas recirculation system including a cross-flow blower, a diverging nozzle and a heater is provided in the reflow chamber or both in the pre-heating chamber and the reflow chamber, so that a hot gas such as heated air is uniformly applied to the object such as a combination of a substrate and an electronic parts carried by the substrate, whereby uniform distributions of temperature and flow velocity of the hot gas are attained. The hot gas recirculation means may be arranged so as to vary the angle at which the hot gas impinges upon the substrate and the breadth over which the hot gas is applied.

10 Claims, 12 Drawing Sheets

REFLOW SOLDERING APPARATUS

BACKGROUND OF THE INVENTION

1. Field of the Invention

The present invention relates to a reflow soldering apparatus for soldering electronic parts to a substrate and, more particularly, to a reflow soldering apparatus providing uniform distributions of temperature and velocity of heating gas and enabling a variation of both the angle at which the hot gas impinges upon the substrate and the length over which the hot gas is applied to the substrate.

Hitherto, reflow soldering methods and apparatus have been proposed in which the local portion where the soldering is to be conducted is heated by a single nozzle or a plurality of nozzles. Such methods and apparatus are disclosed, for example, in Japanese Patent Laid-Open Publication Nos. 53-75148, 54-40255, 59-113689, 61-208291 and 61-255762. On the other hand, Japanese Patent Laid- Open Publication No. 57-132395 discloses a method which can eliminate any lack of uniformity in the soldering attributable to variation in the heat capacities of the electronic parts. A method disclosed in Japanese Utility Model Laid-Open Publication No. 59-61567 employs an arch- type tunnel in which pre-heating is conducted by applying hot air. This method produces an appreciable effect in improving the quality. However, since air having a small heat transfer coefficient is used as the heat medium, it is necessary that the air velocity is increased to a level which would not cause the electronic parts to be blown away. To this end, it is necessary to employ an air blowing means. The aforementioned Japanese Utility Model Laid-Open Publication No. 59-61567 and Japanese Patent Laid-Open Publication Nos. 61-289697, 63-1177960, 63-180368, 63-278668 and 63-296295 disclose the use of a blower for blowing the heating air. It is, however, difficult to blow pre-heating or heating air with high degrees of uniformity of temperature and velocity. In Japanese Patent Laid-Open Publication No. 61-289697, the hot air is directed in parallel with the direction of conveyance of the parts to be heated, while Japanese Patent Laid-Open Publication No. 63-177960 discloses the provision of a flow settling plate disposed at the outlet side of a blower so as to realize a uniform distribution of the hot air over the entire width of the parts to be treated. Japanese Patent Laid-Open publication Nos. 67-84870 and 63-180368 employ flat plates with ports for blowing hot air.

The above-noted, however, still require improvements in the following respects.

Hot air which is circulated through a pre-heating chamber and the interior of the reflow chamber is spread towards the objects to be heated at a spreading ratio which is 5.0 or greater. Thus, the air is not spread uniformly and, hence, the flow velocity distribution of the air, as well as the heat transfer, is not uniform. Consequently, a non-uniform temperature distribution is developed over the objects to be heated.

In order to attain uniform distribution of the air velocity both in the direction of conveyance of the object to be heated and in the breadthwise direction, it is necessary to employ a flow resistance plate such as a flow settling plate or a perforated flat plate with air blowing ports. The air blowing means therefore is required to have a capacity large enough to overcome the increase in the flow resistance posed by such a flow settling plate or perforated plate. This leads to an elevated levels of the power consumption and noise.

The flux components contained in the solder applied to the substrate is evaporated during melting of the solder so as to be mixed in the heating air. The flux components suspended by the air is circulated through the system so as to be deposited to the flow resistance member. The deposition of the flux components not only increases the flow resistance across the flow resistance member but also impairs uniformity of hot air distribution because of non-uniform deposition. In addition, a frequent cleaning of the flow resistance member is required thereby increasing the maintenance cost.

SUMMARY OF THE INVENTION

Accordingly, an object of the present invention is to provide a reflow soldering apparatus incorporating a hot air recirculating means including a cross-flow blower, a nozzle and a heater, with the hot air recirculating means being capable of applying hot air to objects uniformly both in the breadthwise direction and direction of feed of the objects so as to uniformly raise the temperature of the objects and, further, capable of generating an oblique hot air flow which flows into the underside of an IC package so as to melt the solder on leads even when the leads are on the underside of the package as in the case of J-lead type package, thus enabling soldering in a variety of types of devices such as a high-density packaging substrate including a multi-pin type large-size IC packages.

Another object of the present invention is to provide a reflow soldering apparatus in which heating air can be supplied uniformly both in the breadthwise direction or direction of feed of the objects without requiring the use of a resistance member such as a flow settling plate or a perforated plate, thus reducing power consumption and noise of the blower while being more economical.

Still another object of the present invention is to provide a reflow soldering apparatus in which heating air is supplied uniformly both in the breadthwise direction and the direction of feed of the objects without requiring any resistance member such as a flow setting plate or a perforated plate to which flux components suspended in the circulated hot air would deposit so as to eliminate problems such as impairment of uniformity of air velocity distribution and necessity for a frequent cleaning work, thus saving the cost for the cleaning work thereby attaining a higher economy.

A further object of the present invention is to provide a reflow soldering apparatus in which objects are uniformly heated to allow the temperature of the hot gas to be elevated to a level approximating the melting temperature of the solder so as to attain a higher degree of the soldering without being restricted by the heat-resistance of the electronic parts such as IC packages.

To this end, according to the present invention, there is provided a reflow soldering apparatus in which there is provided a hot gas recirculation means comprising a cross-flow blower, a diverging nozzle and a heater and which means is capable of uniformly applying hot gas such as heated air uniformly to the objects, with the hot gas recirculation means being disposed both in a pre-heating chamber and a reflow chamber or in the reflow chamber alone.

The hot gas recirculation means having the cross-flow blower, diverging nozzle and the heater is capable of recirculating hot gas through the preheating chamber and the reflow chamber with high degrees of uniformity of temperature and flow velocity.

The hot gas blown from the diverging nozzle is directed such that the hot air impinges upon the object obliquely upwardly and downwardly so that the hot gas can contact with leads of an electronic part on the object without being interfered by the electronic part itself.

The diverging nozzle may be swung or may have a flow settling plate which can be swung, so as to direct the hot gas from the diverging nozzle in the direction of feed of the object or in a direction perpendicular to the direction of the feed.

The diverging nozzle also can have means for varying the width of the outlet thereof in accordance with the width of the object.

The cross-flow blower has an impeller supported by partition walls or a shield plate which are spaced from each other by a distance not greater than the diameter of the impeller so as to prevent thermal distortion from being caused by the heat of the hot gas, while protecting and shielding the bearings of the impeller from being excessively heated by the hot gas and eliminating any portion to which flux components suspended by the hot air would be deposited, thus allowing an easier maintenance. Additionally, the bearings are forcibly supplied by ambient air to cool the bearing.

In operation, air is suctioned by the cross-flow blower through the heater. The air, which has been heated by crossing the heater, is then boosted by the cross-flow flow blower and is then discharged through the diverging nozzle. The diverging nozzle serves to decelerate the hot gas and to generate oblique flow components of the air. The cross-flow blower inherently has an operation characteristic for uniformalizing the breadthwise flow velocity distribution. Therefore, hot air of uniform distribution can be applied obliquely to the object.

When the diverging nozzle has an outlet which is swingable to vary the blowing direction with respect to the direction of feed of the object, it is possible to apply hot gas at a desired angle to the direction of feed or over a desired range of angle to the direction of feed. When the diverging nozzle incorporates a guide which is oscillatable in the direction perpendicular to the direction of feed of the object, the hot air can be applied in an oscillating manner over an angular range including a direction perpendicular to the direction of feed of the object. It is therefore possible to apply the hot air in all directions without any dead-air region, by virtue of the combination of the swinging of the diverging nozzle and the oscillation of the guide.

The diverging nozzle may be provided at its inlet and/or outlet with a shutter for varying the breadth through which the hot air is blown. In this case, the breadth of the flow of the heated air is adjusted in conformity with the breadth of the object, thus enabling saving of the heat energy.

The impeller of the cross-flow blower is supported by partition walls which are arranged at a spacing not greater than the diameter of the impeller so as to prevent thermal distortion of the impeller which may otherwise be caused by the heat of the hot gas. These partition walls also serve to prevent overheating of the impeller bearings. Thus, there is no portion of the impeller to which the flux components would be deposited even when the recirculation of the hot gas is conducted with the use of a perforated plate, so that the maintenance of the cross-flow blower is remarkably facilitated.

DESCRIPTION OF THE PREFERRED EMBODIMENTS

Figure 1:
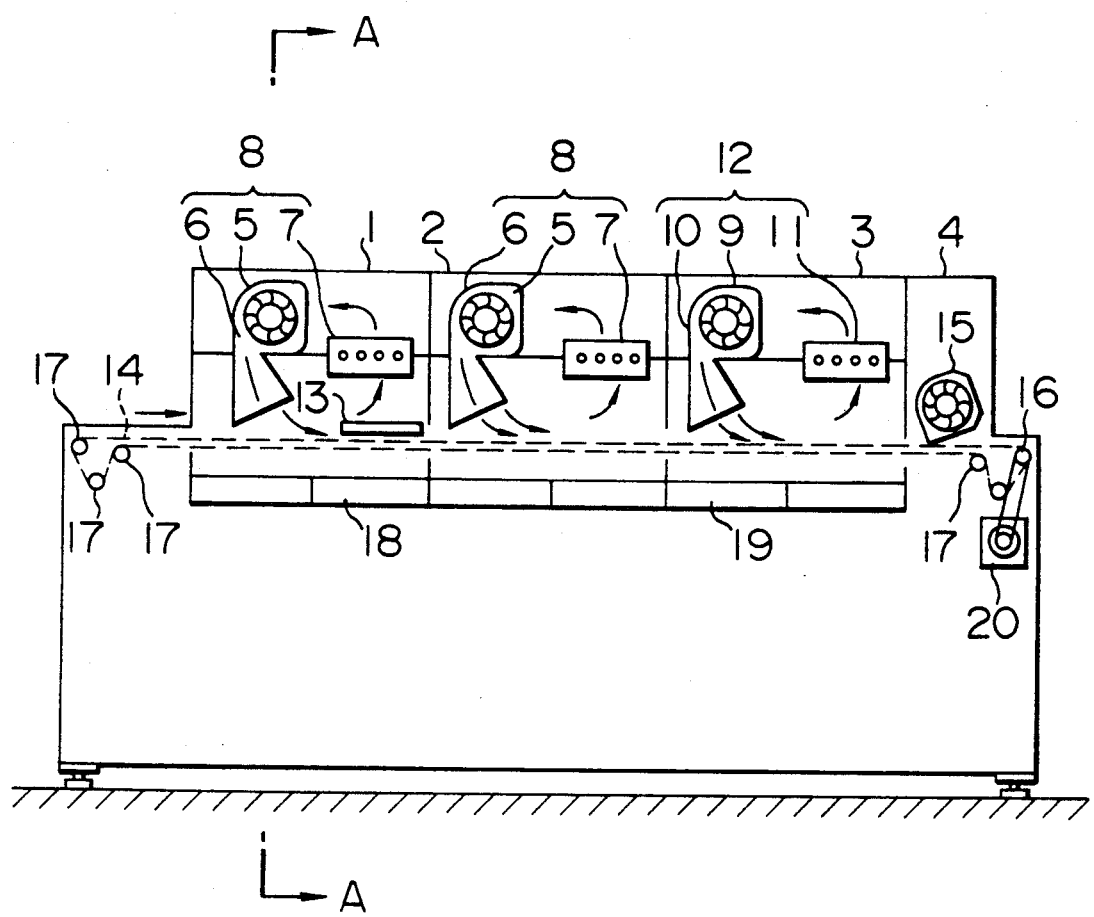
FIG. 1 is a vertical sectional view of an embodiment of the present invention which has a pre-heating chamber having two zones and a reflow chamber having one zone, and which includes an upper hot gas recirculating means and a lower infrared heater.
Figure 2:
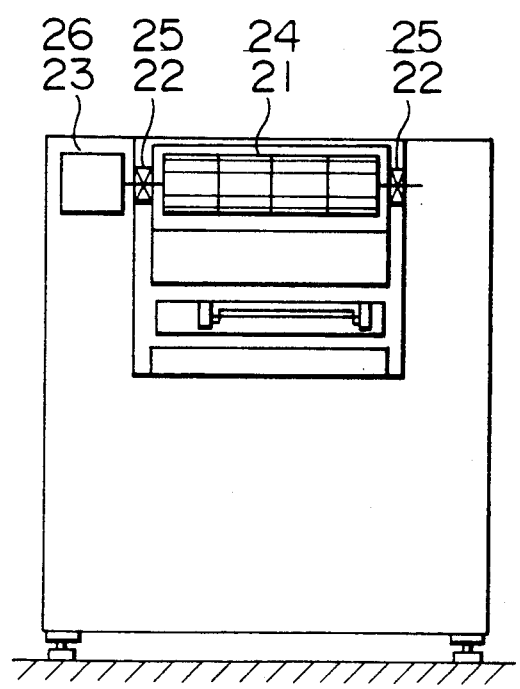
FIG. 2 is a sectional view taken along the line A—A of FIG. 1.

Referring to FIGS. 1 and 2, a first embodiment of the reflow soldering apparatus of the present invention has a pre-heating chamber having a first zone 1 and a second zone 2, a reflow chamber 3, and a cooling chamber 4. Each of the first and second zones 1 and 2 of the pre-heating chamber has a hot gas recirculation means 8 including a cross-flow blower 5, a diverging nozzle 6 and a heater 7. Similarly, a hot gas recirculation means 12 is disposed in the reflow chamber 3. The hot gas recirculation means 12 includes a cross-flow blower 9, diverging nozzle 10 and a heater 11. An endless conveyor 14 for conveying an object to be processed is stretched through the first and second zones 1 and 2 of the pre-heating chamber and through the reflow chamber 3 at a position beneath the hot gas recirculation means 8 and 12. The conveyor 14 is driven by a drive sprocket 16 which in turn is driven by a conveyor drive motor 20. Numeral 17 denotes an idler for the conveyor 14. Infrared heaters 18 are disposed under the portions of the conveyor 14 in the first and second zones 1 and 2 of the pre-heating chamber. An infrared heater 19 also is disposed under the portion of the conveyor 14 in the reflow chamber 3. A cross-flow blower 5 has an impeller 21 which is supported at its both sides by bearings 22 and driven by a blower motor 23. The cross-flow blower 9 provided in the reflow chamber 3 has the same construction.

Figure 23:
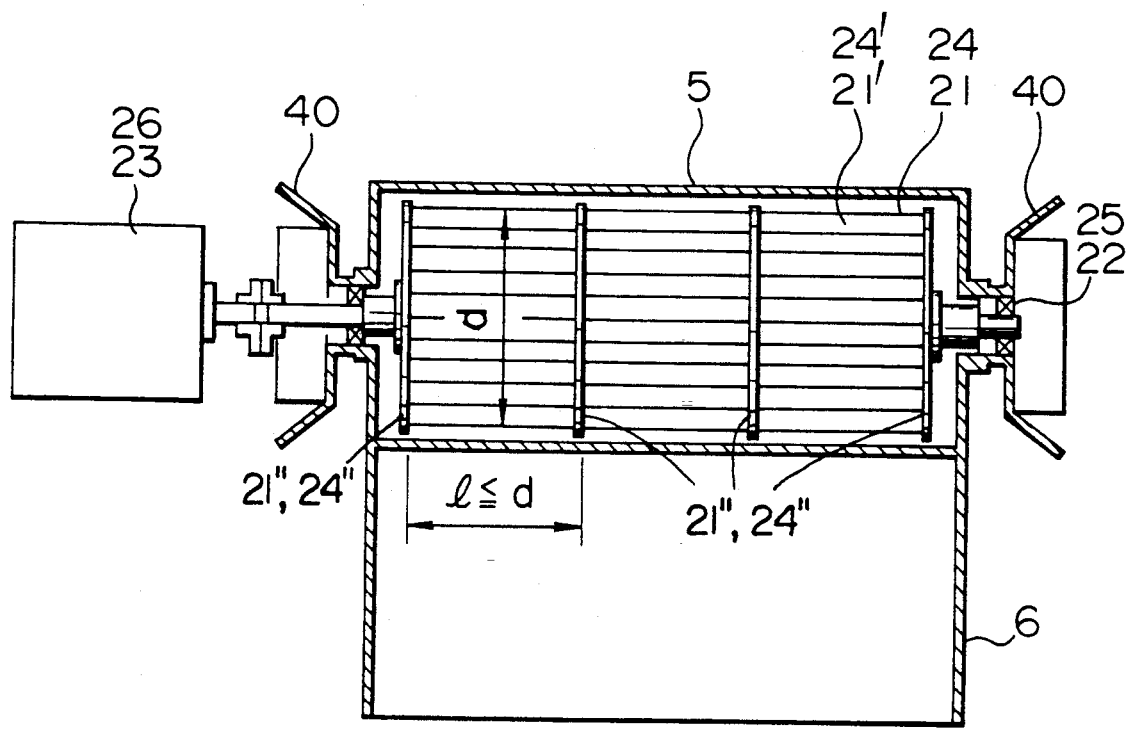
FIG. 23 is a vertical sectional view of a cross-flow blower and a diverging nozzle.

The operation of this embodiment will be described on an assumption that air is used as the heat medium for heating the object 13 to be heated. The air in the first zone 1 of the pre-heating chamber is heated by the heater 7 to a predetermined temperature suitable for the pre-heating and is suctioned and boosted by the impeller 21 of the cross-flow blower so as to be blown against the object 13 through the diverging nozzle 6. As a result, heat is exchanged between the object 13 and the air so that the temperature of the object 13 is raised while the temperature of the air is lowered. The air is then suctioned by the cross-flow blower 5 through the heater 7 so as to be heated again and recirculated through the first zone 1. In each of the cross-flow blowers 5 and 9, the impeller blades 21', 24' is supported by partition walls 21, 24 the distance e of which is determined to be smaller than the diameter d of the impeller 21 as shown in FIG. 23 so that thermal distortion of the blades 21' and 24' of the impellers is avoided. Consequently, each blower can deliver the heated air at a uniform velocity distribution. Each of the diverging nozzles 6 and 10 is capable of applying the hot air to the object at a predetermined angle to the direction of movement of the object 13, so that the temperature of the object 13 can be raised uniformly. Simultaneously with the heating by the hot air, heating is effected also by the infrared heater 18 which applies heat from the underside, so as to prevent any thermal distortion of the object 13. Heating in the second zone 2 of the pre-heating chamber and the heating in the reflow chamber 3 are effected substantially in the same manner as that in the first zone 1. In the reflow chamber 3, however, the heater 11 heats the air in this chamber to a temperature suitable for soldering which is higher than the pre-heating temperature.

The object 13 heated through the first zone 1 and the second zone 2 of the pre-heating chamber is then made to pass through the reflow chamber 3 where soldering is conducted. The object is then introduced into the cooling chamber 4 where it is cooled by air blown by a cooling fan 15, whereby the soldering is completed at a predetermined temperature profile.

Figure 3:
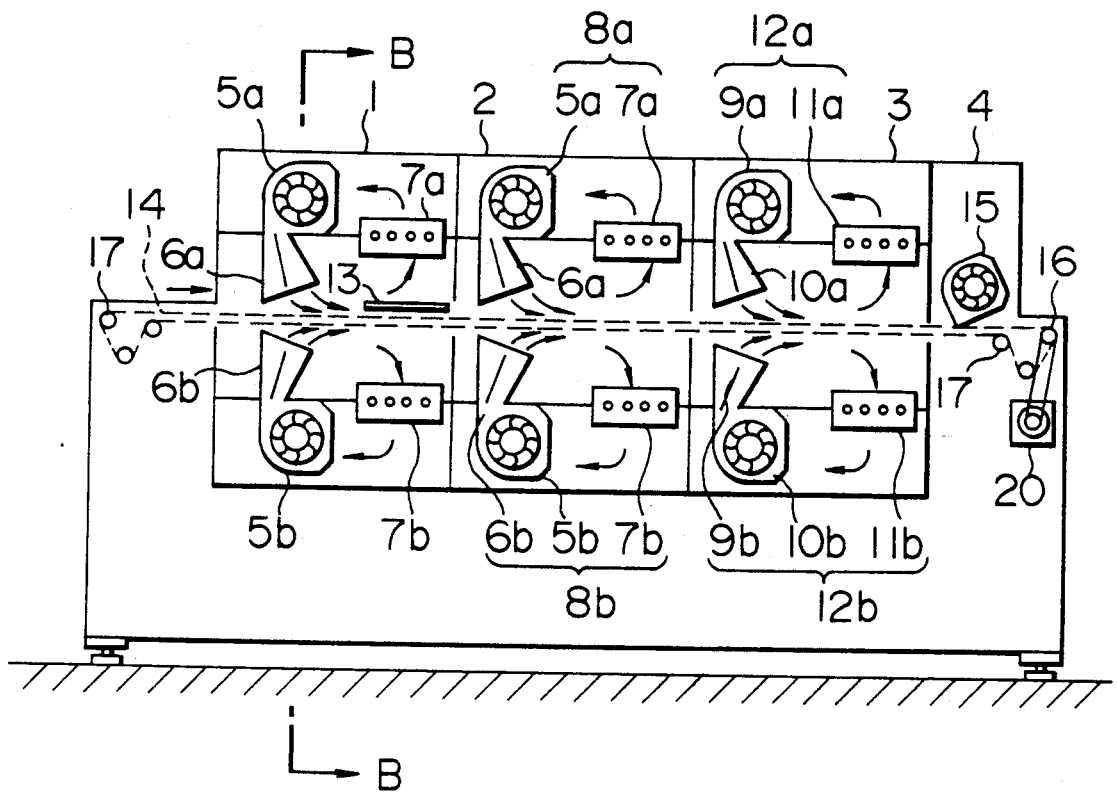
FIG. 3 is a vertical sectional view of another embodiment having upper and lower gas circulation means.
Figure 4:
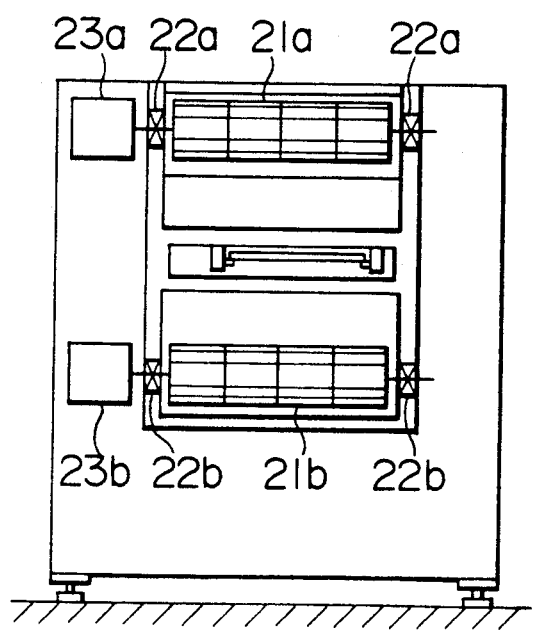
FIG. 4 is a sectional view taken along the line B—B of FIG. 3.

FIGS. 3 and 4 show a second embodiment of the present invention in which hot gas recirculation means 8 and 12 are also provided under the portions of the conveyor 14 in the first zone 1 and the second zone of the pre-heating chamber and in the reflow chamber 3. The second embodiment is suitable for use in the case where the object 13 is a substrate which carries electronic parts at its both sides.

Figure 5:
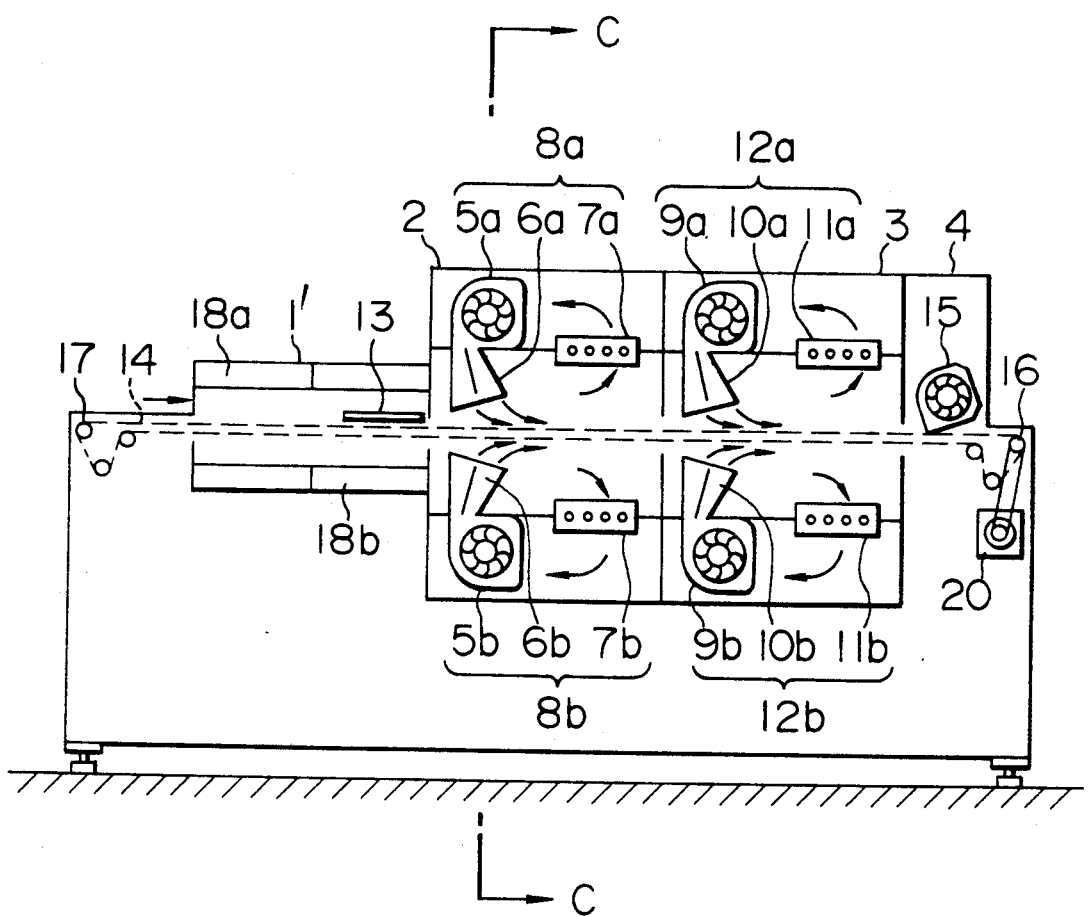
FIG. 5 is a vertical sectional view of another embodiment in which infrared heating means is used in a first zone of the pre-heating chamber while hot gas recirculation means is used in the second zone of the pre-heating chamber and the reflow chamber.
Figure 6:
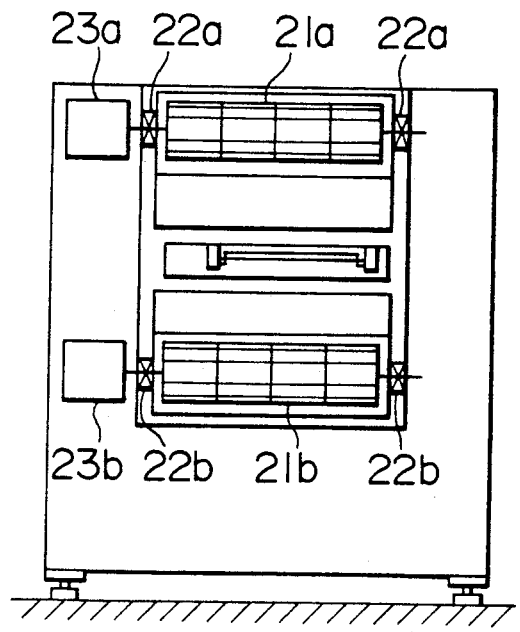
FIG. 6 is a sectional view taken along the line C—C of FIG. 5.

FIGS. 5 and 6 show a third embodiment of the present invention in which a first zone 1' of the pre-heating chamber has infrared heaters 18a and 18b disposed above and below the conveyor 14. In the second zone 2 of the pre-heating chamber and in the reflow chamber 3, hot gas recirculation means 8 and 12 are disposed above and below the conveyor 14. The third embodiment is suitable for use in the case where there is a risk that the electronic parts on the substrate are liable to be moved by the pre-heating air.

Namely, in the third embodiment in which the heating in the first zone 1' of the pre-heating chamber is effected by infrared heaters rather than by hot gas, the electronic parts can be temporarily bonded without moving on the substrate and the thus bonded electronic parts can be uniformly heated by the hot gas while the substrate passes through the second zone 2.

Figure 7:
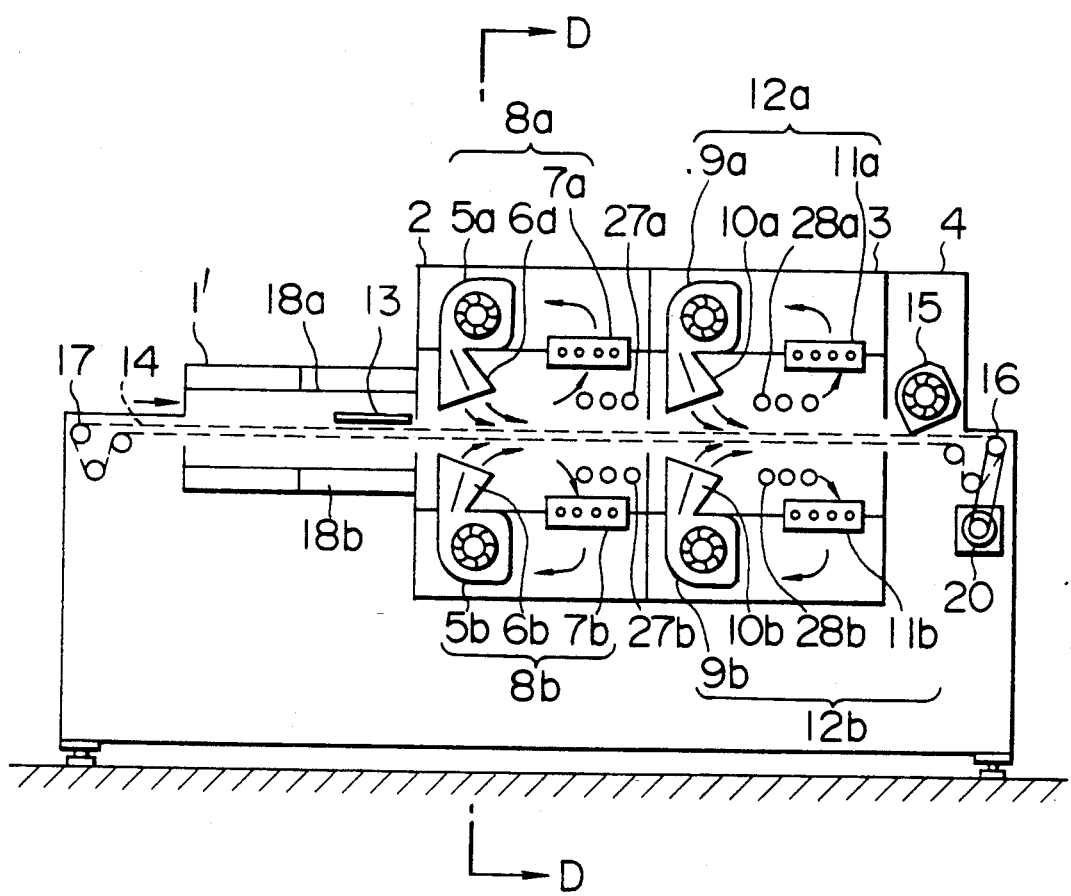
FIG. 7 is a vertical sectional view of a further embodiment of the present invention in which infrared heaters are used downstream of the second zone of the pre-heating chamber and the reflow chamber.
Figure 8:
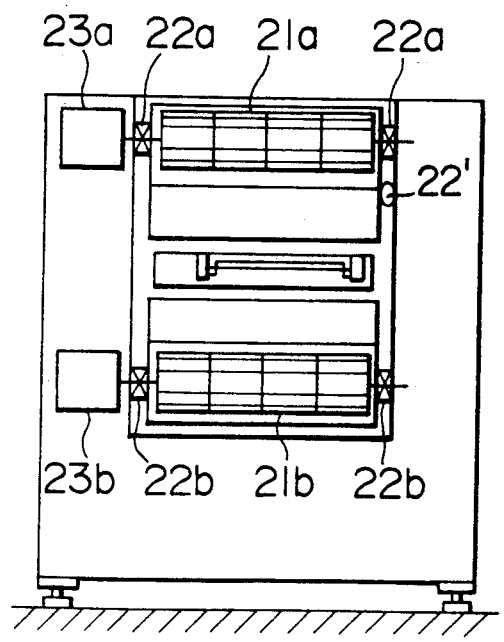
FIG. 8 is a sectional view taken along the line D—D of FIG. 7.

FIGS. 7 and 8 show a fourth embodiment of the present invention in which infrared heaters 27 and 28 are disposed downstream of the diverging nozzles 6 and 10 of the second zone 2 and the reflow chamber 3 which are of the same type as those in the third embodiment. These infrared heaters 27 and 28 cooperate with the hot gas recirculation means 8 and 12 in maintaining the object 13 at the elevated temperature. The bearings 22 are forcibly supplied with ambient air by air supply means 22'.

Figure 9:
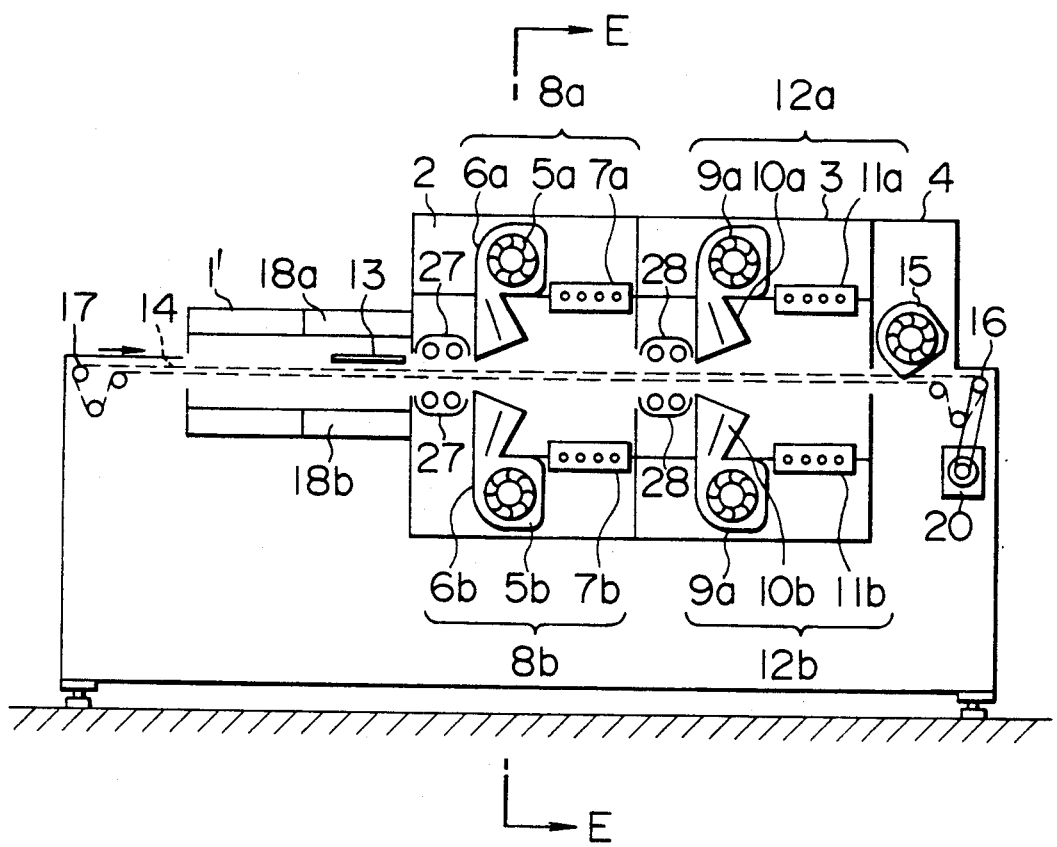
FIG. 9 is an illustration of a further embodiment in which an infrared heater is disposed in an upstream portion of the embodiment.
Figure 10:
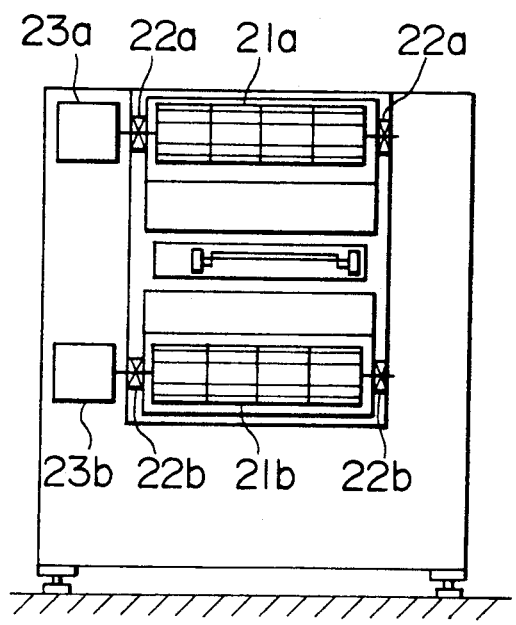
FIG. 10 is a sectional view taken along the line E—E of FIG. 9.

FIGS. 9 and 10 show a fifth embodiment of the present invention in which infrared heaters 27 and 28 are disposed upstream of the diverging nozzles 5 and 10 in the second zone 2 of the pre-heating chamber and the reflow chamber 3 which are of the same type as those in the third embodiment.

Figure 11:
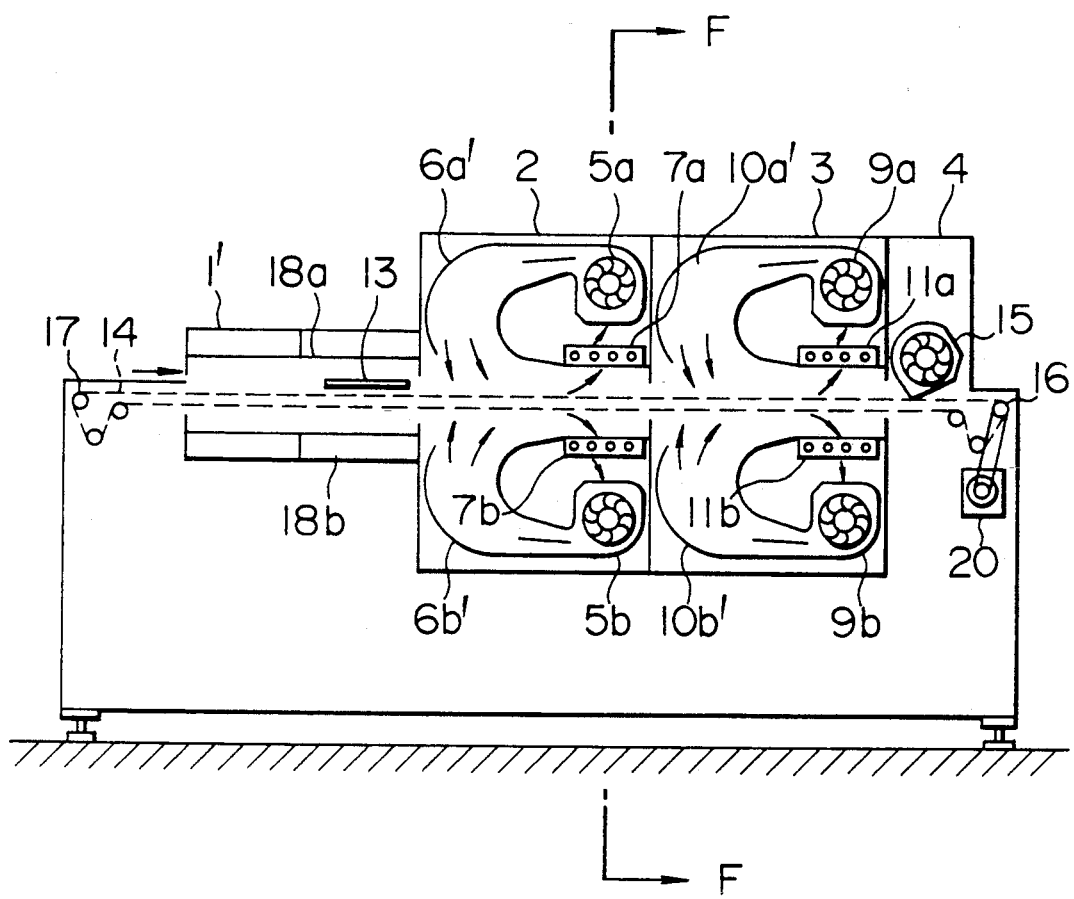
FIG. 11 is a vertical sectional view of a further embodiment of the invention employing a different nozzle.
Figure 12:
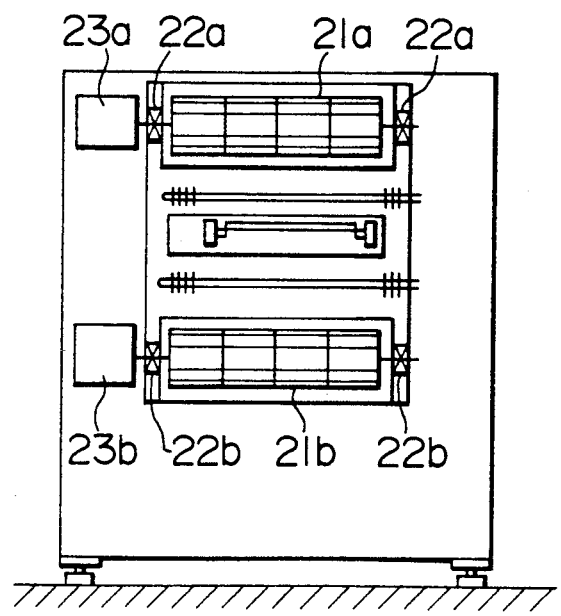
FIG. 12 is a sectional view taken along the line G—G of FIG. 11.

FIGS. 11 and 12 illustrate a sixth embodiment of the present invention in which cross-flow blowers 5 and 9 are disposed above the heaters 7 and 11, respectively, and the diverging nozzles 6' and 10' have such configurations as to face the inlet ends of the zone 2 and the chamber 3. In the sixth embodiment as described, the air outlets of the diverging nozzles 6' and 10' are widened in the horizontal direction so that the height of the flow soldering apparatus can be reduced as compared with the first to fifth embodiments. In addition, the velocity distribution of the blown air can be further uniformalized by virtue of the widened air outlets.

Figure 13:
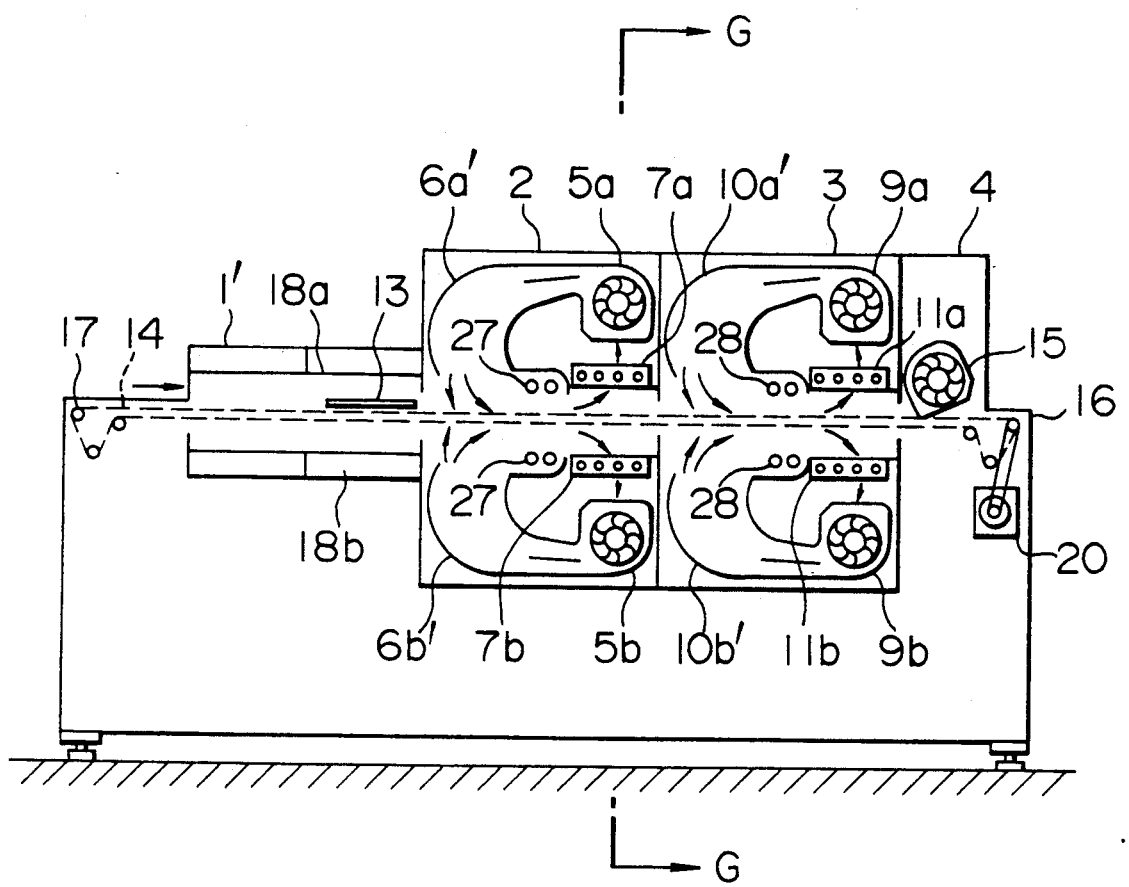
FIG. 13 is a vertical sectional view of a further embodiment of the invention employing an infrared heater.
Figure 14:
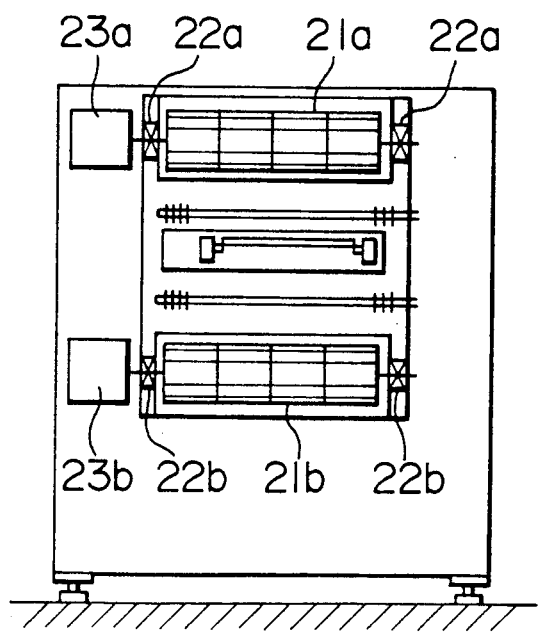
FIG. 14 is a sectional view taken along the line G—G of FIG. 13.

FIGS. 13 and 14 show a seventh embodiments of the present invention in which infrared heaters 27 and 28 are disposed downstream of the diverging nozzles 6' and 10' used in the sixth embodiment. This arrangement makes it easy to maintain the object 13 at the elevated temperature.

Figure 15:
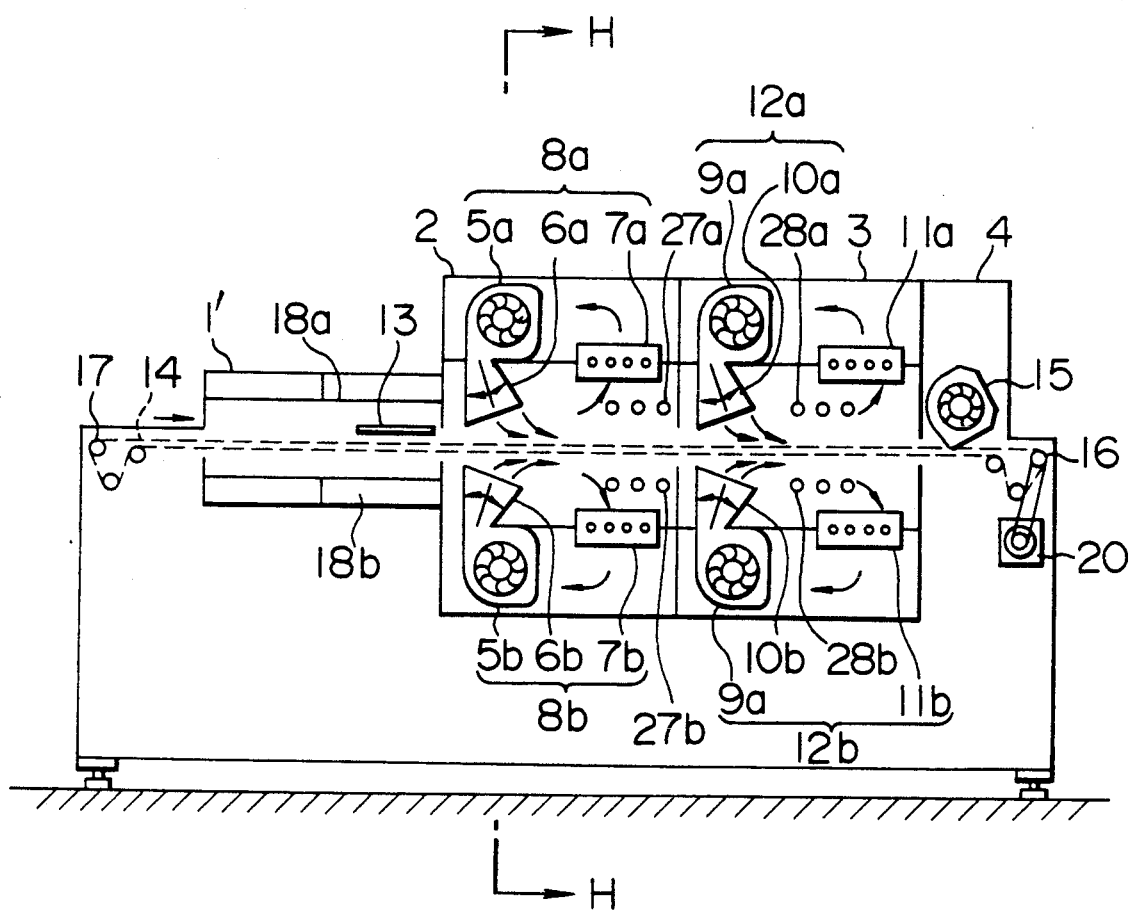
FIG. 15 is a vertical sectional view of a further embodiment of the present invention employing a blower oscillation mechanism.
Figure 16:
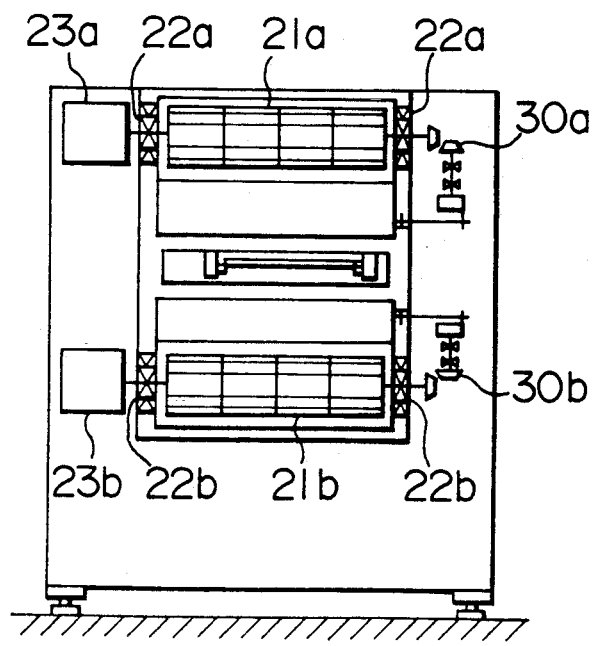
FIG. 16 is a sectional view taken along the line H—H of FIG. 15.

FIGS. 15 and 16 show an eighth embodiment in which the cross-flow blowers 5, 9 and the diverging nozzles 6, 10 of the second zone 2 of the pre-heating chamber and the reflow chamber 3 are oscillatable in the direction of feed of the object 13. This arrangement makes it possible apply the hot air also to the portion of the object which portion is shaded by the electronic part.

Figure 17:
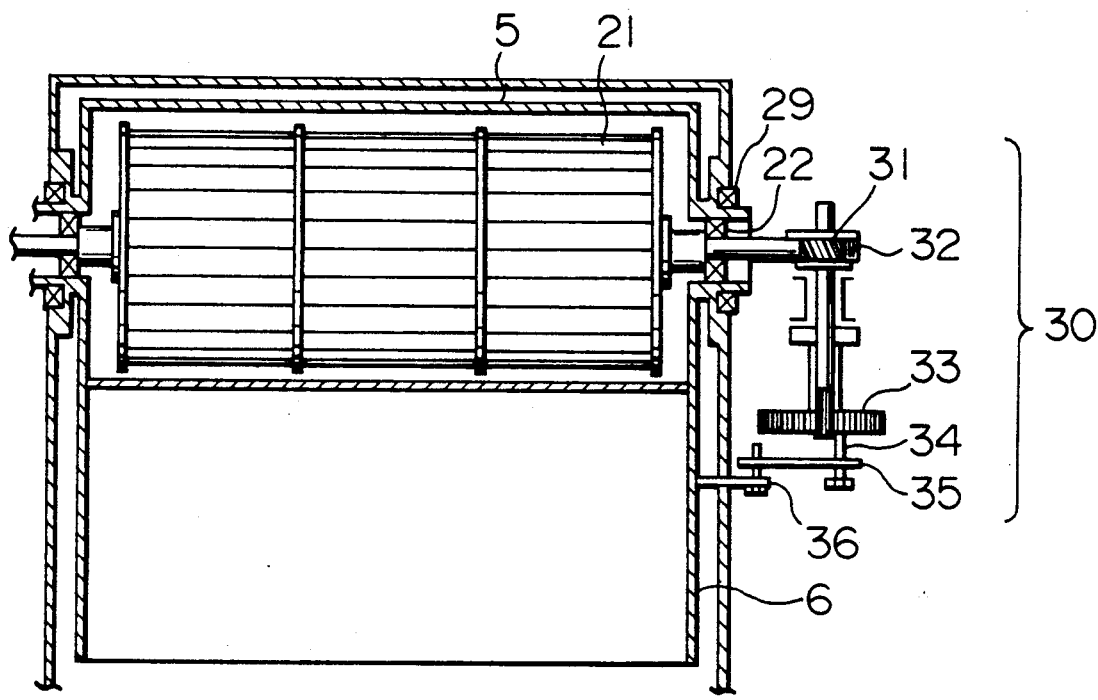
FIG. 17 is a vertical sectional view of a blower oscillation mechanism.
Figure 18:
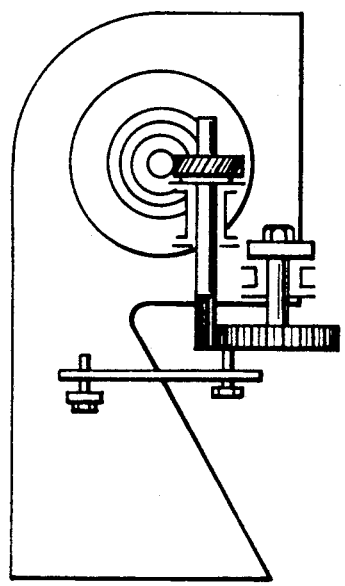
FIG. 18 is a right side elevational view of the mechanism shown in FIG. 17.

FIGS. 17 and 18 illustrate the mechanism for causing oscillation of the nozzles in the eighth embodiment. The oscillation mechanism, which is denoted by 30, includes a gear train composed of gears 31, 32, 33, oscillation pins 34, connecting plates 35 and pins 36. A worm gear 31 on the end of the impeller shaft carrying the impeller 21 drives a gear shaft 32 at a reduced speed, and the gear shaft 32 in turn drives an oscillation gear 33 at a reduced speed. The rotation of the oscillation gear 33 causes an eccentric rotation of an oscillation pin 34 which in turn causes a movement of a pin 36 connected to a connecting plate 35, whereby the diverging nozzle 6 is oscillated in the direction of feed of the object.

Figure 19:
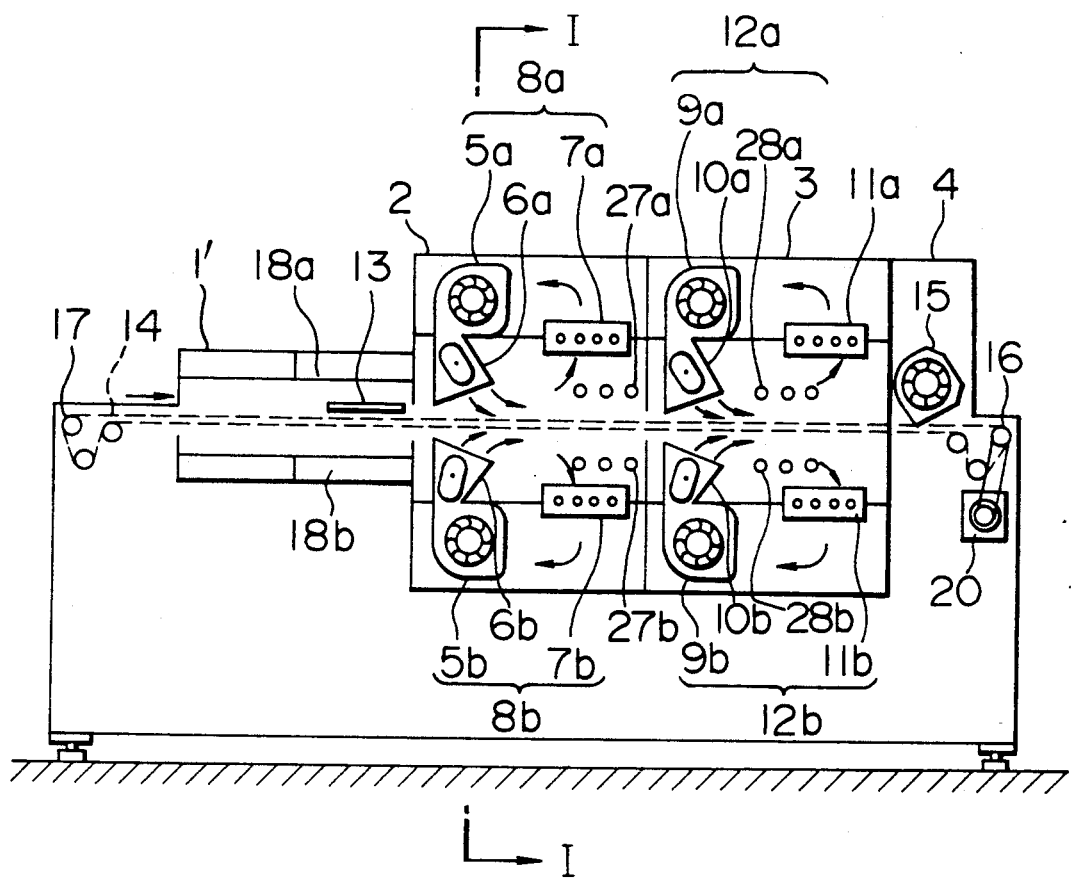
FIG. 19 is a vertical sectional view of a further embodiment of the present invention having a guide and a guide oscillation mechanism.
Figure 20:
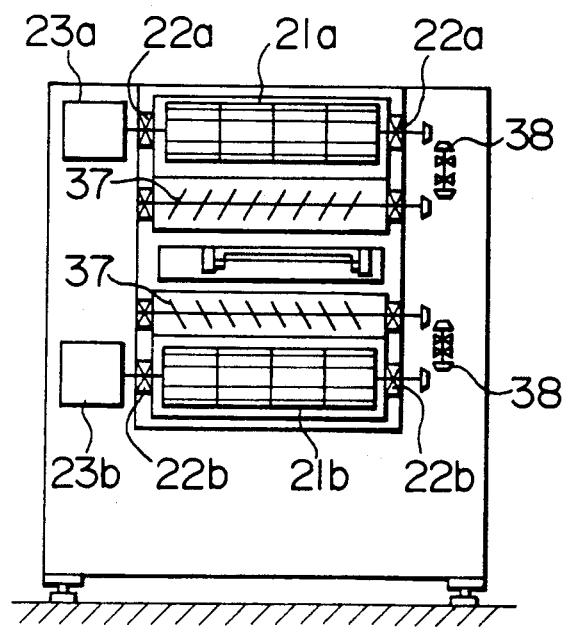
FIG. 20 is a sectional view taken along the line I—I of FIG. 19.

FIGS. 19 and 20 show a ninth embodiment of the present invention in which guides 37 or flow settling plate are disposed in the diverging nozzles 6 in the second zone 2 of the pre-heating chamber and in the reflow chamber 3 of the fourth embodiment. The guides 37 are oscillatable by guide oscillation mechanisms 38 so as to direct the hot gas in directions perpendicular to the direction of feed of the object. This arrangement enables hot gas to be applied even to portions which are shaded by the electronic parts.

Figure 21:
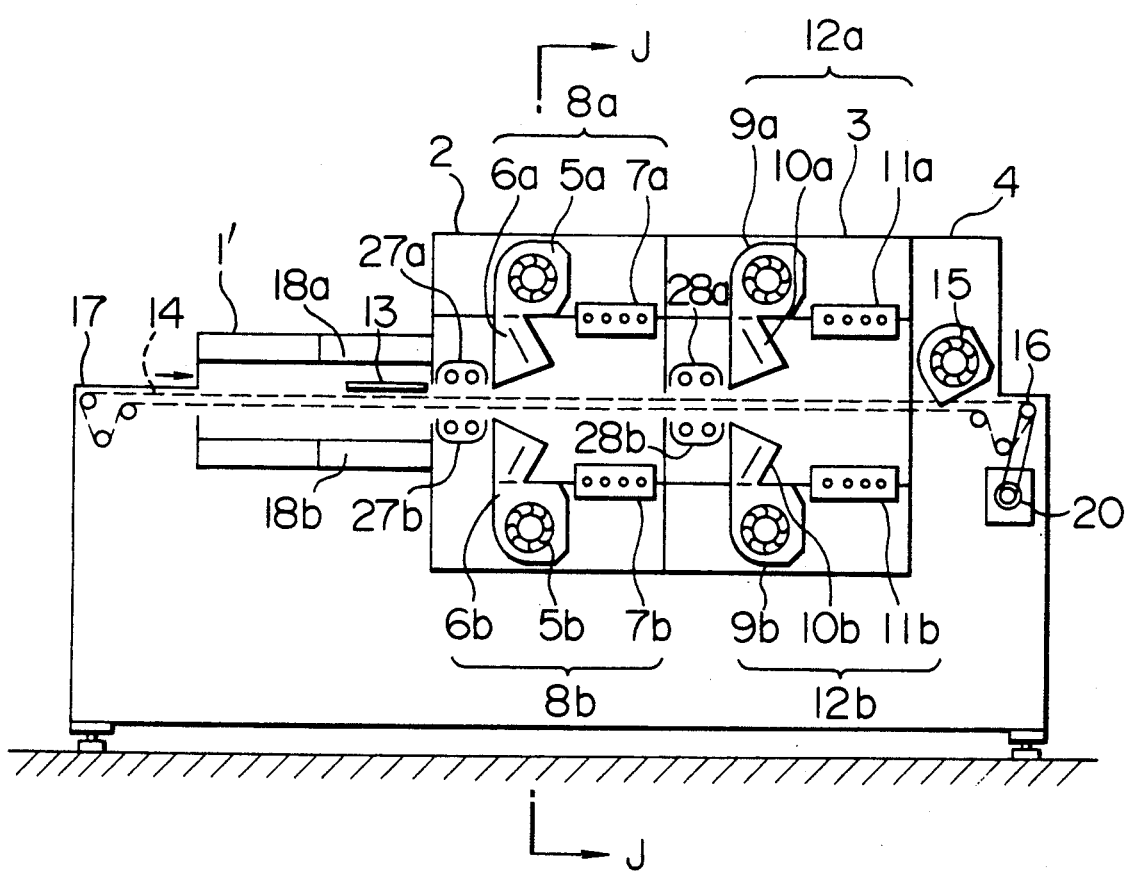
FIG. 21 is a vertical sectional view of a further embodiment incorporating a segmented shutter connected to a conveyor and disposed at the outlet of a blower.
Figure 22:
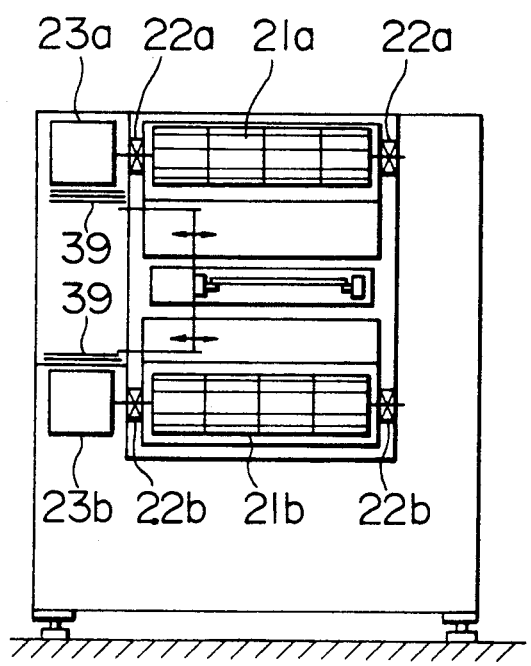
FIG. 22 is a sectional view taken along the line J—J of FIG. 21.

FIGS. 21 and 22 illustrate a tenth embodiment of the present invention in which the cross-flow blowers 5 and 9 of the second zone 2 of the pre-heating chamber and the reflow chamber 3 of the same type as those in the fifth embodiments are provided at their outlets with segmented shutter devices 39 which can open and close in accordance with a breadthwise movement of the conveyor 14, thus enabling the hot gas to be blown over a breadthwise region corresponding to the breadth of the object 13.

Figure 24:
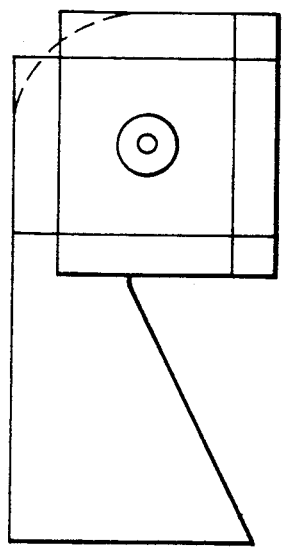
FIG. 24 is a right-side elevational view of the diverging nozzle.

FIGS. 23 and 24 illustrate an example of the cross-flow blower usable in the embodiments described hereinbefore. In this blower, the spacing e of the partition walls 21'', 24'' or shield plate supporting the impeller blades 21', 24' is determined to be not greater than the diameter d of the impeller 21, 24 so that a greater mechanical strength against thermal distortion caused by hot gas is attained as compared with the known cross-flow blowers. Bearings 22 supporting the impeller are provided with cooling fins 40 so as to extend the life of these bearings 22.

Although the invention has been described through its specific forms, it is to be understood that the described embodiments are only illustrative. For instance, the air used as the heat medium in the described embodiments may be substituted by other suitable substance.

What is claimed is:

1. A reflow soldering apparatus in which an object including a substrate and an electronic part carried by said substrate is pre-heated and heated by a hot gas while being conveyed by a conveyor so as to reflow a solder thereby soldering said electronic part to said substrate, said apparatus comprising: hot gas recirculation means for applying said hot gas to said object, a cross-flow blower, a diverging nozzle and a heater, said cross-flow blower having an impeller which is supported at both sides of the impeller by partition walls having a spacing smaller than the diameter of said impeller.

2. A reflow soldering apparatus according to claim 1, wherein said impeller is supported by said partition walls through bearings, each of the bearing including fins for cooling through a heat exchange with ambient air 3. A reflow soldering apparatus as in claim 2, wherein each of the bearings includes a shield plate for shielding the bearing from the hot gas.

4. A reflow soldering apparatus according to claim 1, wherein said diverging nozzle directs the hot air blown therefrom obliquely to a direction of feed of said object.

5. A flow soldering apparatus according to claim 1, wherein said diverging nozzles oscillates in a direction of feed of said object.

6. A reflow soldering apparatus according to claim 1, wherein said diverging nozzle is provided with a guide capable of oscillating a direction of discharge of a hot gas in the direction perpendicular to a direction of feed of said object.

7. A reflow soldering apparatus in which an object including a substrate and an electronic part carried by said substrate is pre-heated and heated by a hot gas while being conveyed by a conveyor so as to reflow a solder thereby soldering said electronic part to said substrate, said apparatus comprising: a pre-heating chamber for pre-heating said object; a reflow chamber for heating said object to reflow said solder; and a hot gas recirculation means provided in said reflow chamber or in both said pre-heating chamber and said reflow chamber, said hot gas recirculation means including a cross-flow blower, a diverging nozzle and a heater, whereby said object is heated to a predetermined temperature, and wherein said cross-flow blower has an impeller supported by bearings, each of said bearings including fins for cooling said bearings through a heat exchange with ambient air, and wherein each of the bearings includes air supplying means for forcibly supplying each of the bearings with ambient air.

8. A reflow soldering apparatus in which an object including a substrate and an electronic part carried by said substrate is pre-heated and heated by a hot gas while being conveyed by a conveyor so as to reflow a solder thereby soldering said electronic part to said substrate, said apparatus comprising: a pre-heating chamber for pre-heating said object; a reflow chamber for heating said object to reflow said solder; and a hot gas recirculation means provided in said reflow chamber or in both said pre-heating chamber and said reflow chamber, said hot gas recirculation means including a cross-flow blower, a diverging nozzle and a heater, whereby said object is heated to a predetermined temperature, and wherein said cross-flow blower has an impeller supported by bearings, each of said bearings including fins for cooling said bearings through a heat exchange with ambient air, and wherein each of the bearings includes a shield plate for shielding said bearings from the hot gas, and wherein each of the bearings includes air supplying means for forcibly supplying each of the bearings with ambient air.

9. A reflow soldering apparatus in which an object including a substrate and an electronic part carried by said substrate is pre-heated and heated by a hot gas while being conveyed by a conveyor so as to reflow a solder thereby soldering said electronic part to said substrate, said apparatus comprising: a pre-heating chamber for pre-heating said object; a reflow chamber for heating said object to reflow said solder; and hot gas circulation means provided in said reflow chamber or in both said pre-heating chamber and said reflow chamber, said hot gas recirculation means including a cross-flow blower, a diverging nozzle and a heater, whereby said object is heated to a predetermined temperature, wherein said cross-flow blower has an impeller supported by bearings, each of the bearings including at least one of a shield plate for shielding said bearings from said hot gas, fins for cooling through a heat exchange with ambient air, and air supplying means for forcibly supplying said bearing with ambient air.

10. A reflow soldering apparatus in which an object including a substrate and an electronic part carried by said substrate is pre-heated and heated by a hot gas while being conveyed by a conveyor so as to reflow a solder thereby soldering said electronic part to said substrate, said apparatus comprising:

hot gas circulation means including a cross-flow blower, a diverging nozzle and a heater so that the hot gas is blown onto the object with uniform hot gas temperature and uniform hot gas velocity distribution in the breadthwise direction of said object, wherein said cross-flow blower has an impeller supported by bearings, each of the bearings including at least a shield plate for shielding said bearings from said hot gas, fins for cooling through a heat exchange with ambient air, and air supplying means for forcibly supplying said bearing with ambient air.

* * * * *